Figure 1:
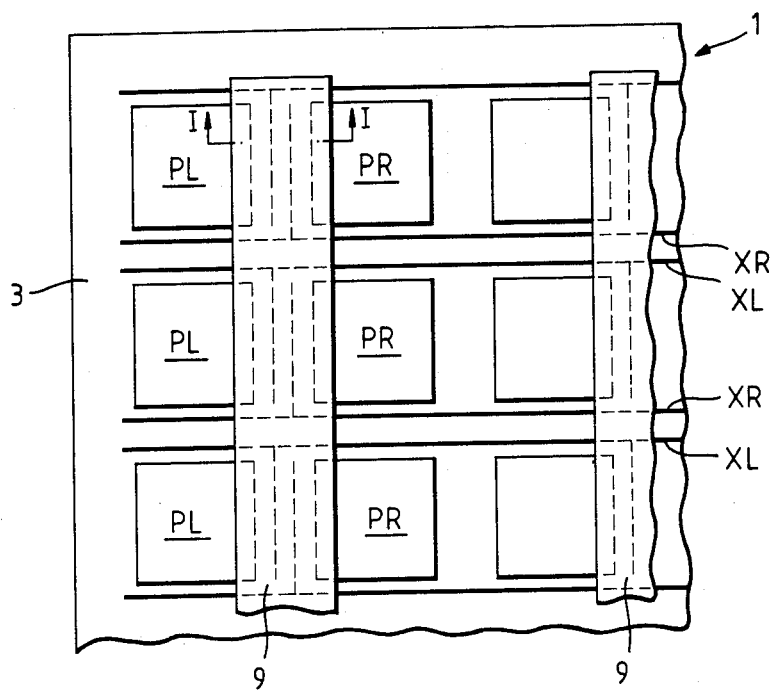

United States Patent [19]

Benjamin et al.

[11] Patent Number: 4,808,983
[45] Date of Patent: Feb. 28, 1989

[54] FLAT-PANEL DISPLAY AND A PROCESS FOR ITS MANUFACTURE

[75] Inventors: John D. Benjamin, Malvern; Adrian L. Mears, Cheltenham; John C. White, Colwall, all of England

[73] Assignee: The Secretary of State for Defence in Her Majesty's Government of the United Kingdom of Great Britain and Northern Ireland, London, England

[21] Appl. No.: 691,887

[22] Filed: Jan. 16, 1985

[30] Foreign Application Priority Data

Feb. 1, 1984 [GB] United Kingdom ................. 8402654

[51] Int. Cl.$^4$ .............................................. G02F 1/13
[52] U.S. Cl. .................................... 340/719; 340/784; 350/344
[58] Field of Search .............: 340/765, 814, 784, 718, 340/719; 350/344, 334, 333, 332

[56] References Cited

U.S. PATENT DOCUMENTS

| | | | |
|---|---|---|---|
| 3,786,307 | 1/1974 | Robinson | 340/781 |
| 3,845,615 | 11/1974 | Cake | 340/784 |
| 4,112,333 | 9/1978 | Asars et al. | 340/784 |
| 4,229,736 | 10/1980 | Rougeot | 340/718 |
| 4,233,602 | 11/1980 | Hanmura | 340/752 |
| 4,359,729 | 11/1982 | Nonomura et al. | 340/765 |
| 4,368,467 | 1/1983 | Unotoro et al. | 340/800 |
| 4,368,523 | 1/1983 | Kawale | 340/784 |
| 4,429,305 | 1/1984 | Hosokawa et al. | 340/719 |
| 4,448,491 | 5/1984 | Okubo | 350/344 |
| 4,491,391 | 1/1985 | Nickal et al. | 350/344 |
| 4,499,459 | 2/1985 | Sasaki et al. | 340/784 |
| 4,586,039 | 4/1986 | Nonomura et al. | 340/719 |

FOREIGN PATENT DOCUMENTS

| | | |
|---|---|---|
| 0031143 | 1/1981 | European Pat. Off. . |
| 0033214 | 2/1983 | Japan ................................. 350/344 |
| 2067812 | 7/1981 | United Kingdom . |
| 2084778 | 4/1982 | United Kingdom . |

Primary Examiner—John W. Caldwell, Sr.
Assistant Examiner—Alvin Oberley
Attorney, Agent, or Firm—Nixon & Vanderhye

[57] ABSTRACT

A flat panel VDU or TV screen has pixel elements controlled by an array of small single crystal semiconductor bars or chips. Power and information are connected directly or capacitatively to the chips; chip surfaces have pick-up pads. X-Y address lines are provided on a VDU panel substrate, and each chip has bridging links to complete continuity of the Y-line. For data address, data lines are provided on the substrate, and decoding an address recognition circuitry is incorporated in each chip. Chips may be responsive to more than one address, and may be addressed either singly or using a single code address. Each chip may control its neighboring pixels. A single crystal wafer is processed and mounted on a support. Chips are defined by back etching the wafer and separated by stretching the support prior to transfer to a substrate. Self aligned electrodes may be produced using a mask stretched on the surface of the support. Alternatively the electrodes may be produced photolithographically, using shallow angle and overhead illumination. The chips or bars may also be located by means of vacuum chucks.

11 Claims, 14 Drawing Sheets

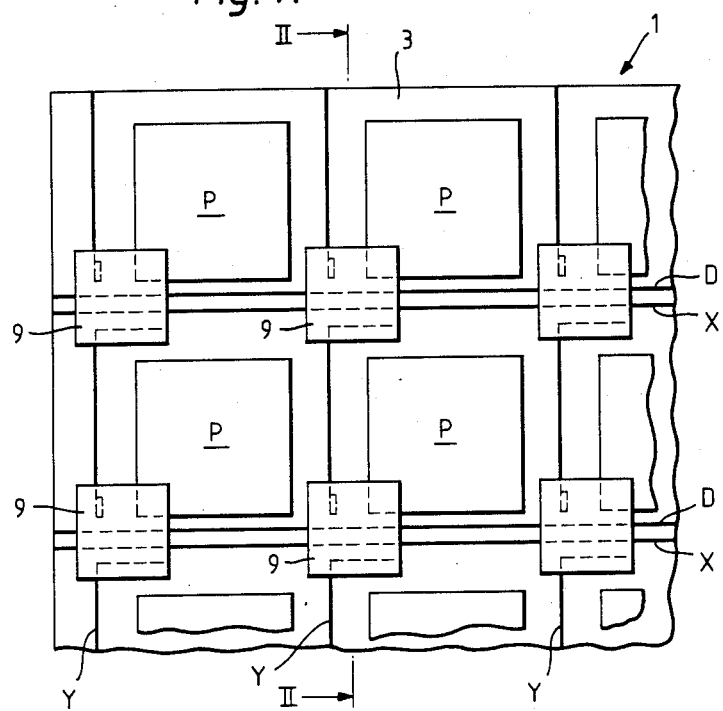
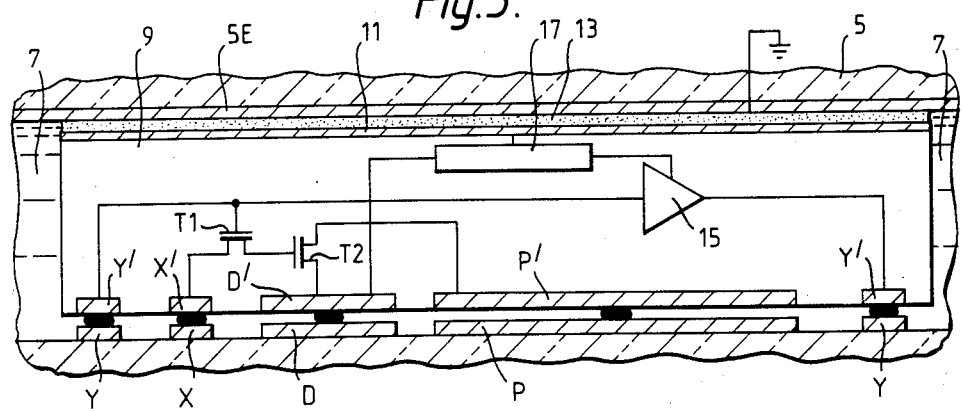

FLAT-PANEL DISPLAY AND A PROCESS FOR ITS MANUFACTURE

TECHNICAL FIELD

This invention relates to a display incorporation semiconductor devices for pixel drive and manufacturing techniques therefor. It is concerned particularly with electrically addressable panels for the display of graphics and information—video display units (VDUs), and also display screens for television (TV). More particularly, this invention concerns displays of the type that incorporates semiconductor device components each of which serves to control and/or sustain the application of drive signals to a corresponding picture element (pixel) of the display.

BACKGROUND

Hitherto, construction of such flat-panel displays has been approached in one of two principal ways:

The first approach uses a wafer of single crystal semiconductor material, usually silicon, as the rear electrode-bearing substrate of the display panel. The pixel control devices are integrated within this structure. Wrist-watch sized displays have been produced using this technique. Larger area panels using 20 cm diameter silicon wafers, are under current development. Even though this monolithic construction technology is well-advanced, there are drawbacks. The process of 20 cm diameter wafers is both difficult and expensive because of problems relating to crystal uniformity, wafer warpage, wafer handling, etc. Also the area of silicon required is greater than that of the panel display area; a large quantity of semiconductor material is required. (See 'A 480×480 element dichrome display dye MOS LCD', K Kasahara et al, Society for Information Display XIV 1983. Library of Congress Card No. 75-642555).

The second approach uses a thin film transistor technique; the rear substrate includes a film of polycrystalline or amorphous silicon in which transistors are embodied. Difficulties arise due to the poor characteristics of devices made in polycrystalline silicon, especially as regards to leakage of reverse biassed pn junctions. Displays have been produced using this technique, typically displays with no more than $4 \times 10^4$ pixels, with most, but not all, pixels working. Much development will be required however, and many serious problems will need to be overcome, if working displays with $\sim 10^6$ pixels are to be achieved. (See 'Silicon TFTs for Flat Panel Displays', F. Morin, Proceedings of the 14th Conference (1982 International) on Solid State Devices, Tokyo 1980; Japanese Journal of Applied Physics 22 (1983) Supplement 22-1 pp481–485. Related articles by other authors follow on pp487–500).

THE DISCLOSURE OF THE INVENTION

The invention disclosed herein provides a flat-panel display of alternative construction to those outlined above.

In accordance with this invention there is provided a flat-panel display of the kind comprising electrode-bearing substrates, disposed on respective sides of an electrically responsive optical medium, the electrodes borne thereon being configured to define a multiplicity of pixels; together with a multiplicity of electronic components for controlling the application of drive signals to pixels electrodes corresponding therewith; characterised in that:

said electronic components are embodied in physically separate elements of single-crystal semiconductor material, these elements being located between the electrode-bearing substrates and arranged with each element coupled to one or more neighbouring pixel electrodes.

The invention retains the advantages of using single-crystal material, but at the same time overcomes the prior art disadvantage of having to process an area of semiconductor material greater than that of the display area. Since the elements are of single crystal material, standard processing technology can be employed, and the components can be well characterised. The display offers the circuit complexity of a display mounted on single crystal silicon for displays with a much larger area and at a much lower cost because of the smaller chip area needing processing. It can be used in either transmissive or reflective light modes, since the area of the elements need constitute but a small fraction of the total display area. Nor is it essential that the display construction be planar. The flexibility of this approach allows construction over non-planar surfaces—e.g. over windscreens of cars or aircraft.

The flat-panel display may include bars of single-crystal semiconductor material, each bar extending over many adjacent pixel elements. Adjacent bars will be spaced apart in the direction normal to their extent. Whilst the length of such displays are limited to the size of wafer utilised for the purpose of construction, considerable latitude is afforded in the orthogonal dimension.

Alternatively, the flat-panel display may include chips of single-crystal semiconductor material, these chips being arranged in a regular two-dimensional array. This allows a latitude of choice for the length and width dimensions of the display. The chips may be of simple design, each overlapping only a single corresponding pixel electrode and serving to control only this electrode. However, with greater complexity in the integrated circuit design, and in the drive and address circuitry supporting the display, the chips may be arranged overlapping several adjacent pixel electrodes—e.g. 2, 4, or 6, and may control these several pixels simultaneously. With some sophistication, the chips may be made to incorporate quite complex circuits and may have considerable intelligence, so only changes of information updating the pictures need be sent to the display. The chips may also perform some processing of the picture—for example, they may scroll it or alter its contrast.

Provided that the thickness of each element—bar or chip—is chosen to match the thickness of the encapsulated medium—further advantage is attainable. Each element can thus serve as a spacer, assist in maintaining the thickness of the flat-panel uniform, and, add to panel rigidity—a feature particularly important in large area panels.

BRIEF INTRODUCTION OF THE DRAWINGS

Figure 2:
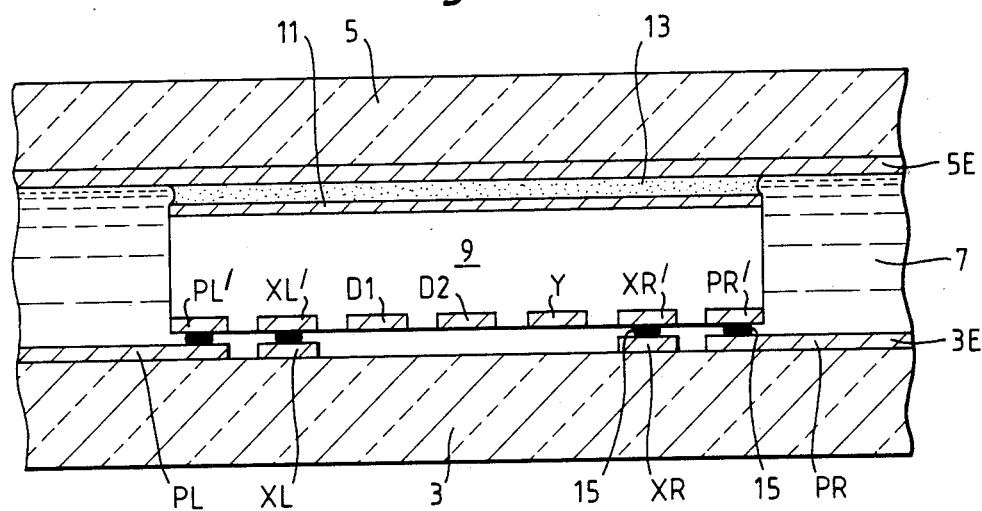
Figure 3:
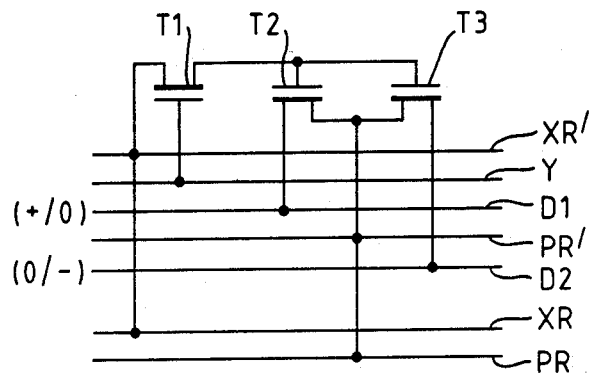
Figure 6A:
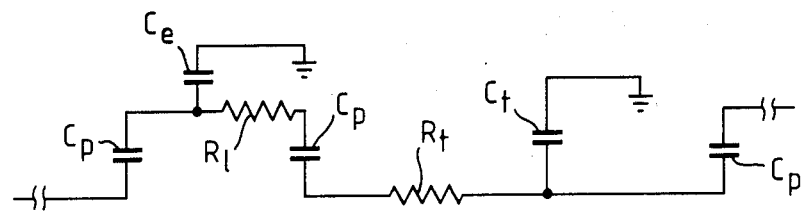
Figure 6B:
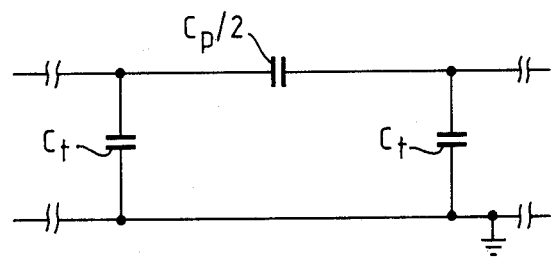
Figure 7:
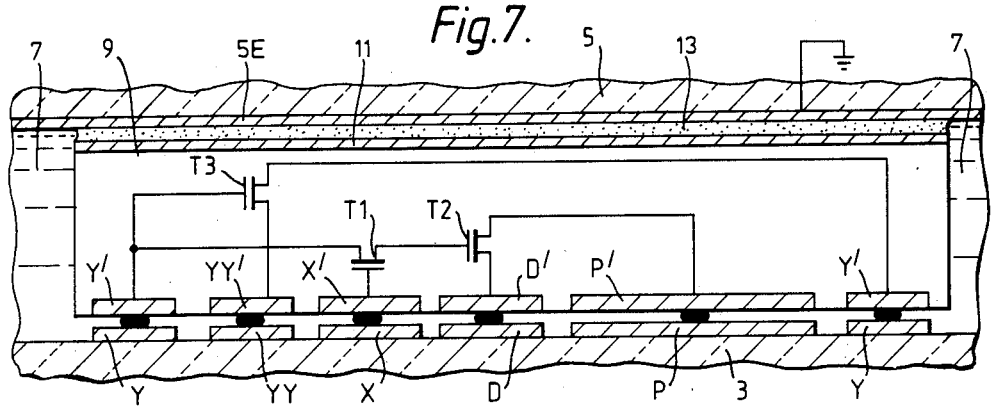
Figure 8:
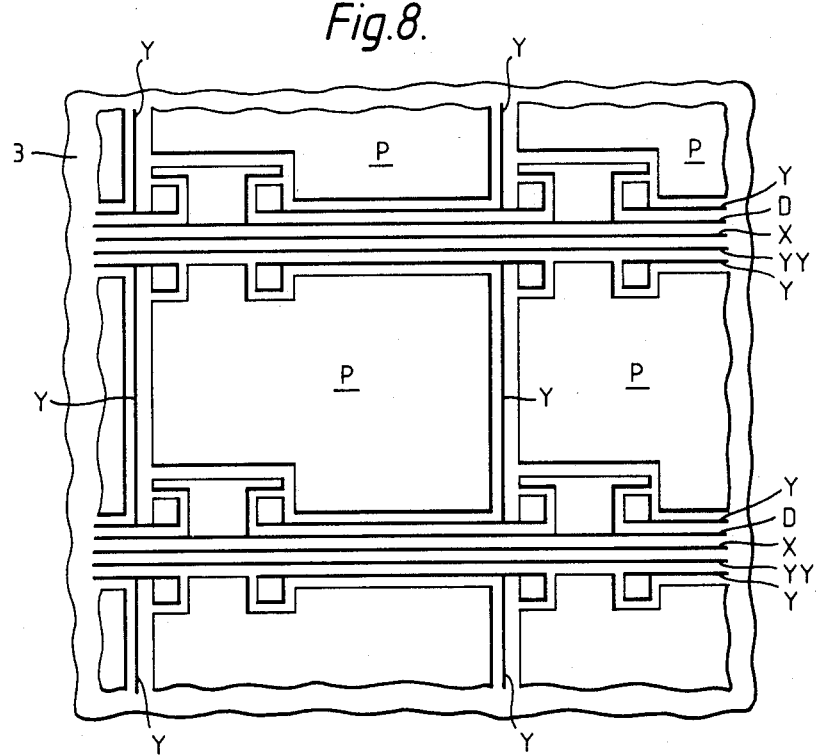

In the drawings accompanying this specification:

FIGS. 1 and 2: are illustrative drawings showing in plan, and in enlarged cross-section in plane I—I of this plan, respectively, part of a spaced-bar flat-panel liquid crystal display;

FIG. 3: is a circuit diagram showing the construction of a typical pixel control circuit, one of many like circuits embodied in each of the bars shown in FIGS. 1 and 2 above;

FIGS. 4 and 5: are illustrative drawings showing in plan, and in enlarged diagrammatic cross-section in plane II—II of this plan, respectively, part of an X-Y addressed distributed-chip flat-panel liquid crystal display, and showing circuit detail;

FIGS. 6A and B: are equivalent circuit diagrams for one of the Y-address lines of the display shown in FIGS. 4 and 5 above, full equivalent and simplified equivalent circuits respectively. (Detail of boost amplification is omitted);

FIG. 7: is a circuit and layout diagram, an alternative to the scheme of FIG. 5 above;

FIG. 8: is a plan view of an electrode layout, to illustrate the use that can be made of parallel signal paths.

Figure 9:
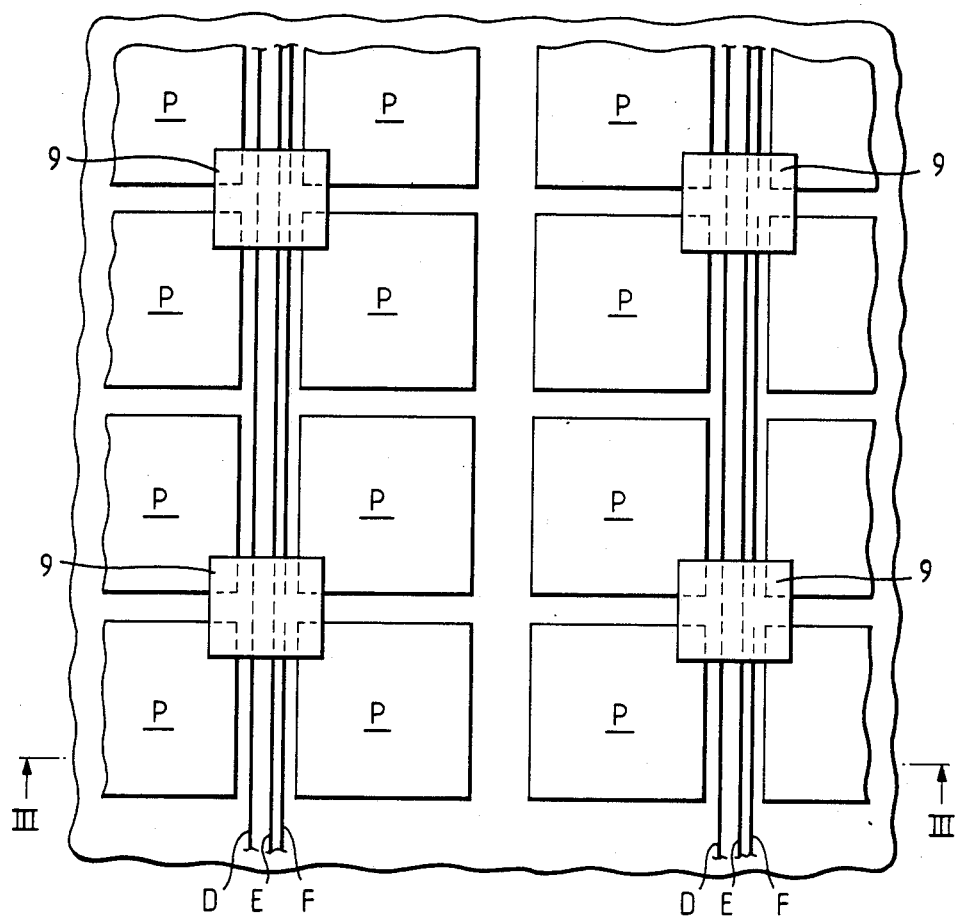
Figure 10:
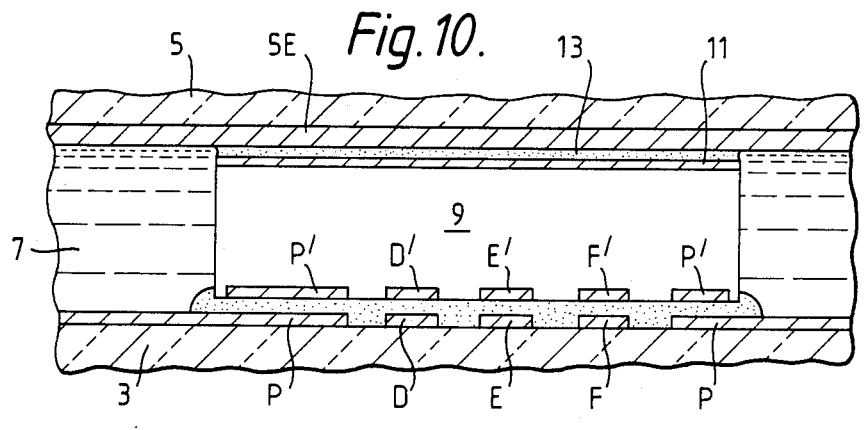
Figure 11:
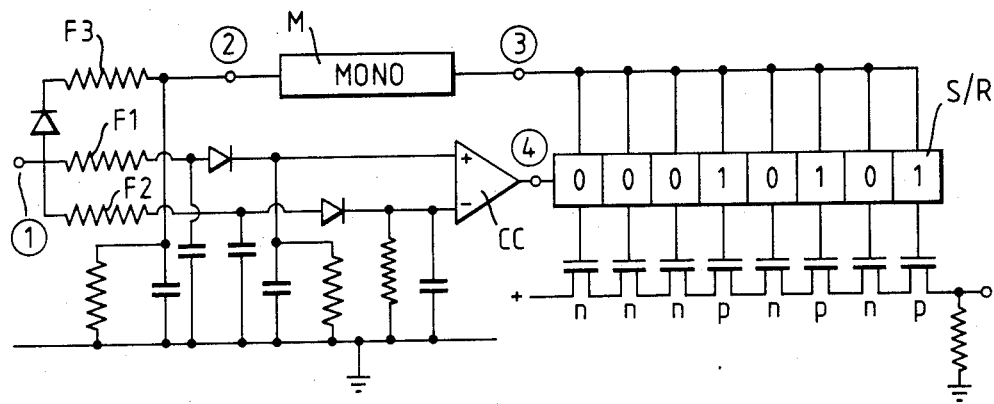
Figure 12:
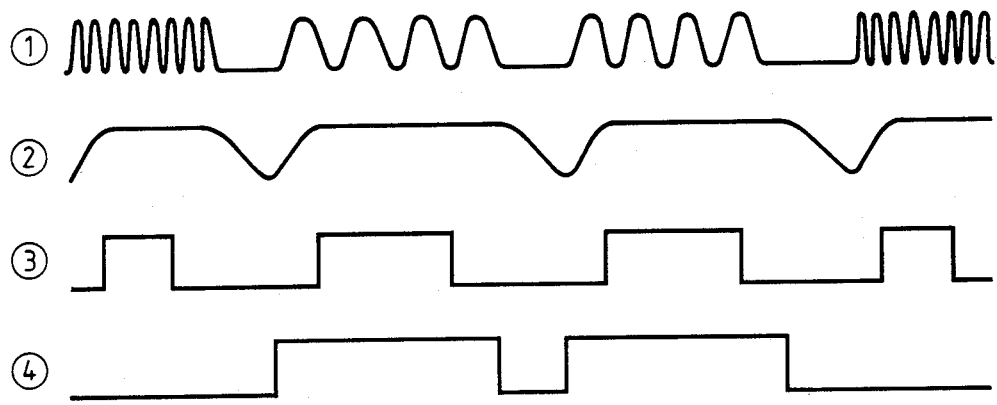
Figure 13:
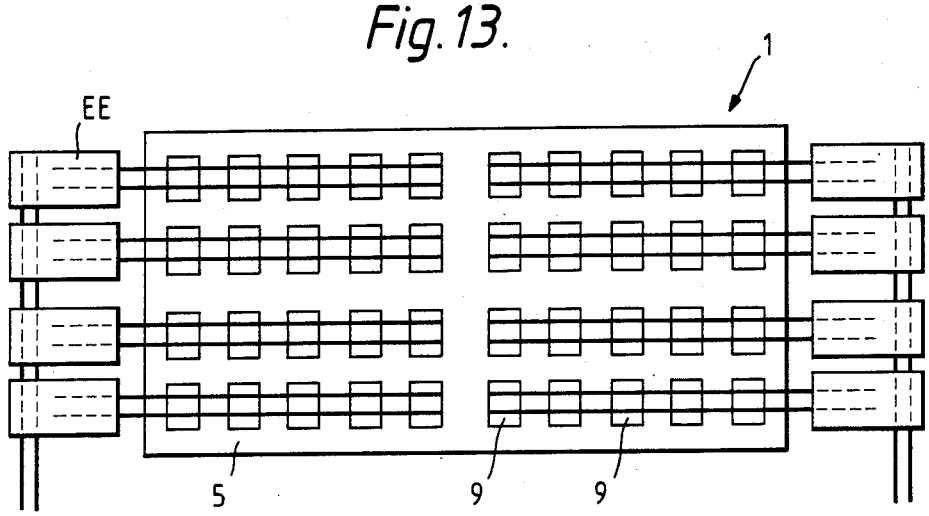
Figure 14:
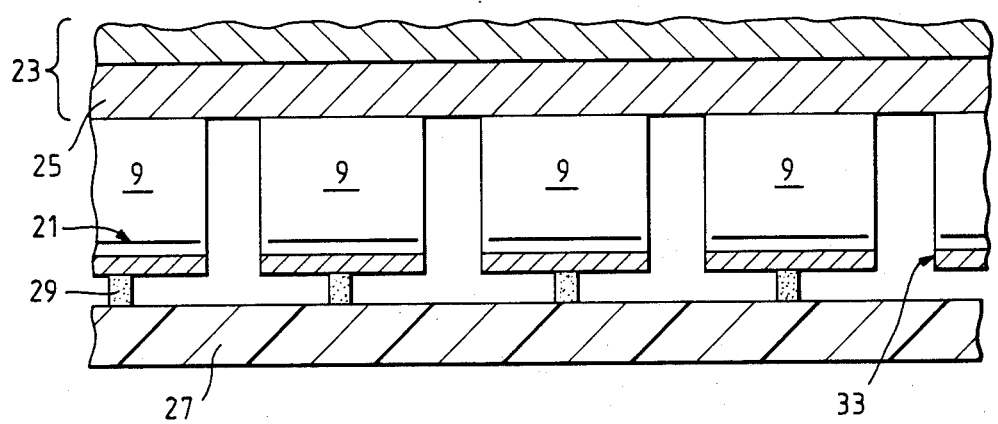
Figure 15:
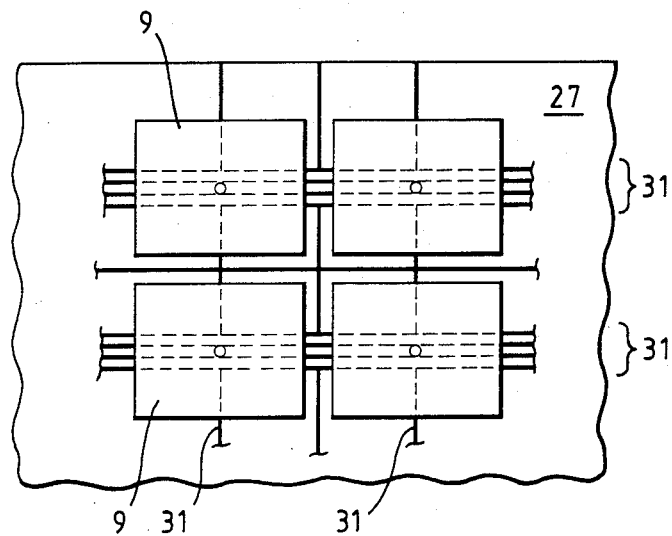
Figure 16:
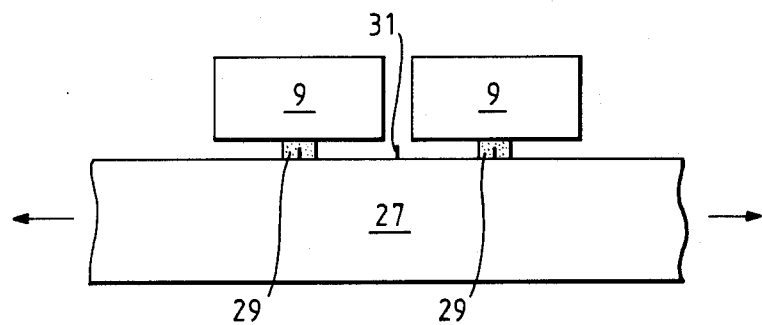
Figure 17:
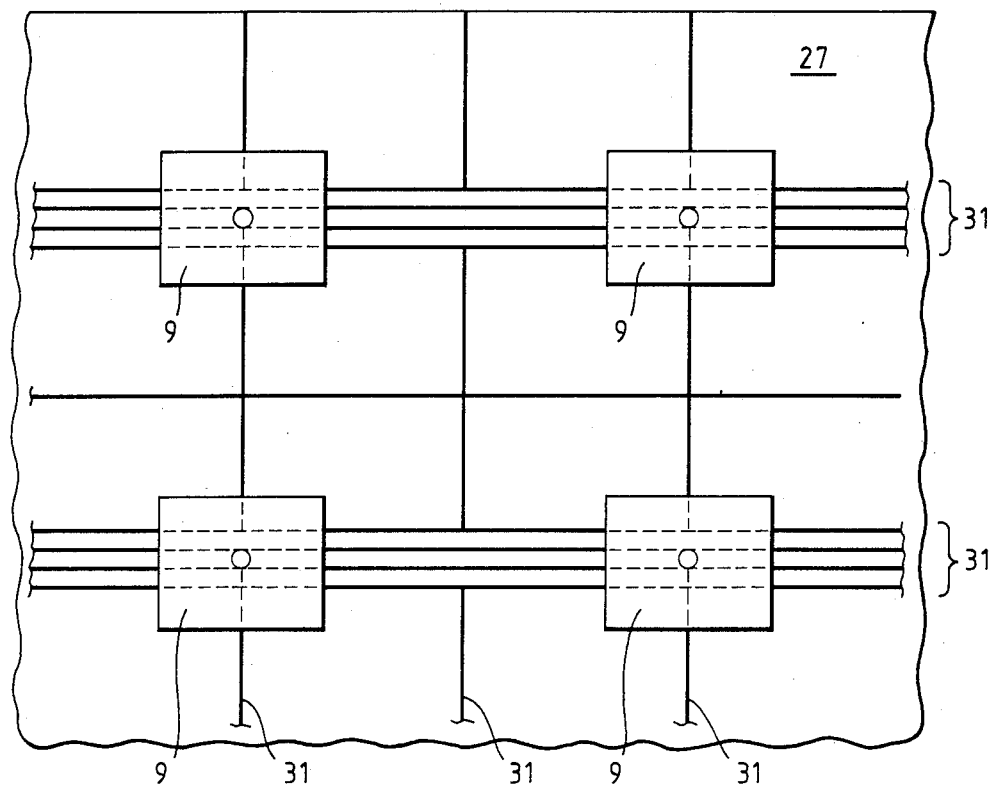
Figure 18:
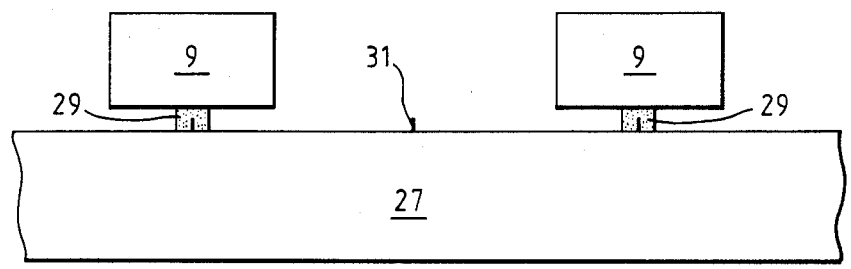
Figure 19:
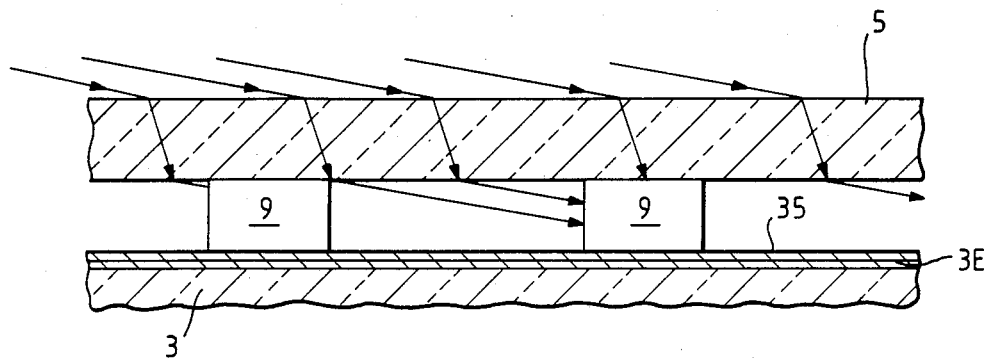
Figure 20:
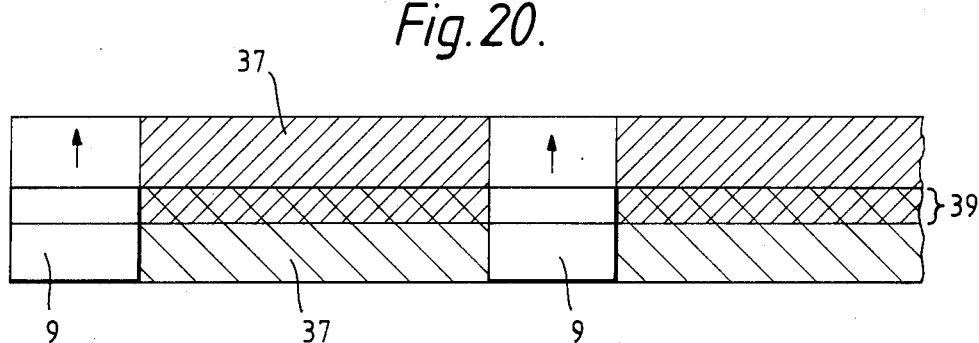
Figure 21:
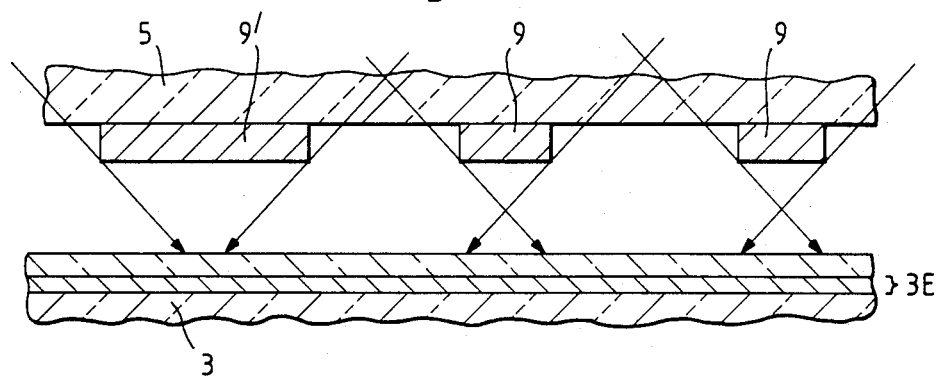
Figure 22:
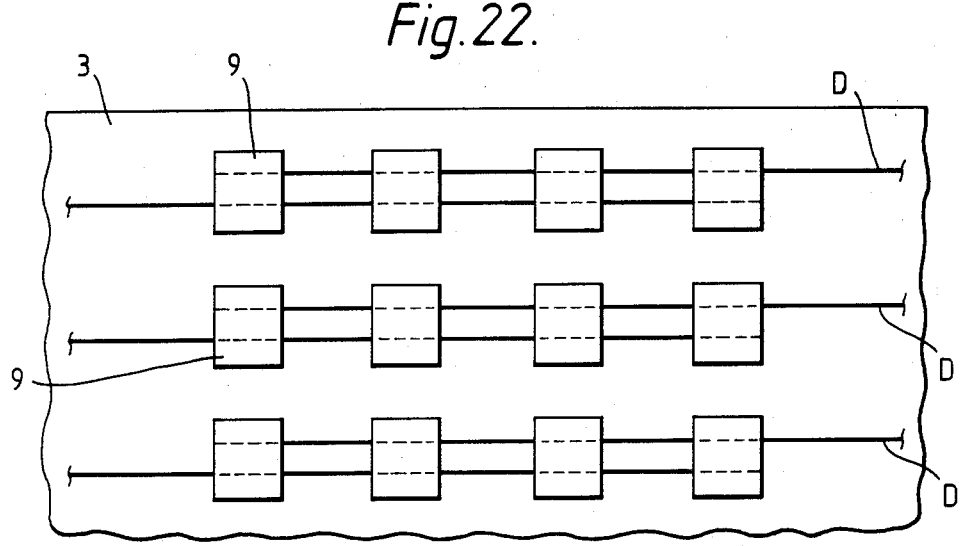
Figure 23:
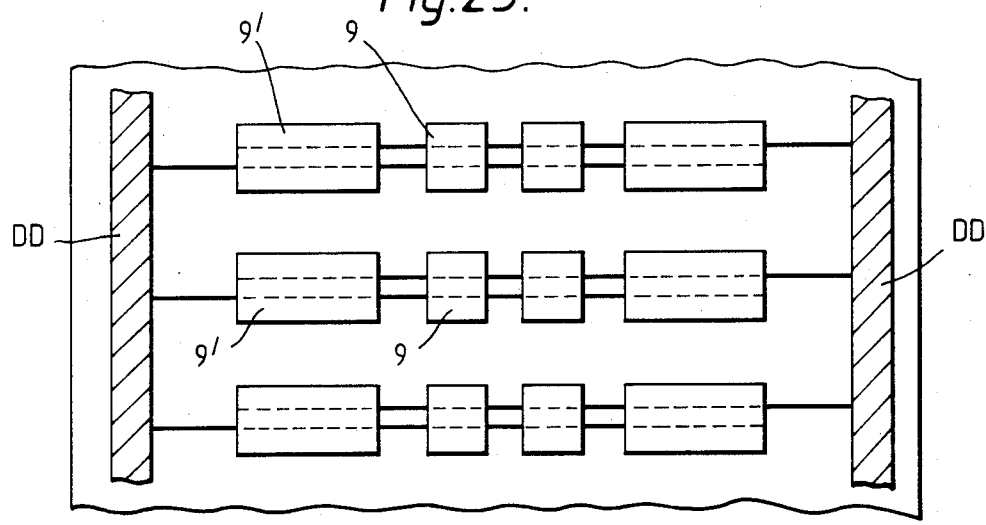

FIGS. 9 and 10: are illustrative drawings showing plan and in enlarge cross-section in plane III—III of this plan, respectively, part of a data addressed chip element flat-panel display;

FIG. 11: is a circuit diagram of a decoding circuit, one that can be incorporated within each chip for the display shown in FIGS. 9 and 10 above;

FIG. 12: is a timing diagram showing signals at points in the decoding circuit of FIG. 11;

FIG. 13: is a schematic plan showing a possible encoder and chip layout such as may be used for a flat-panel TV-screen;

FIG. 14: is an illustrative cross-section showing mounting of a grooved silicon wafer upon a elastomeric substrate, in preparation for chip separation;

FIGS. 15 and 16: are illustrative drawings showing in plan an in cross-section, respectively, chips, mask pattern and elastomer, as arranged prior to stretching;

FIGS. 17 and 18: are illustrative drawings in plan and cross-section, respectively, showing the same chips, mask pattern and elastomer, but after stretching;

FIGS. 19–21: illustrate the use of shadow techniques in the making of electrodes aligned to mounted chips, FIGS. 22 and 23: are plan views of electrode structures produced by shadow techniques.

Figure 24A:
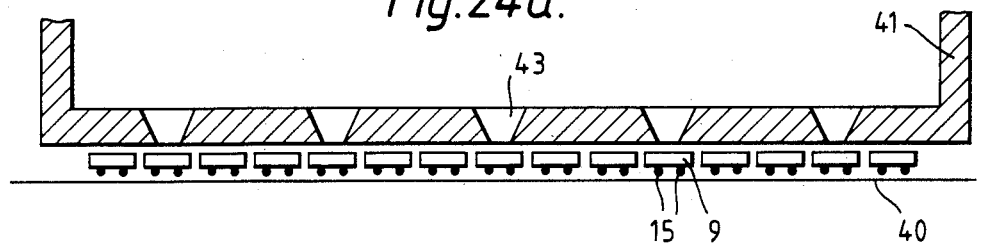
Figure 24B:
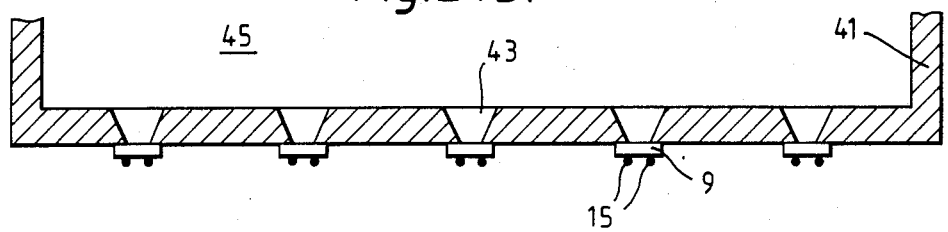
Figure 24C:
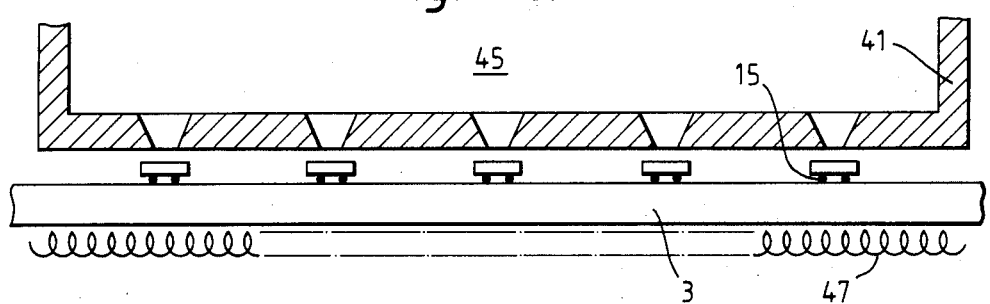
Figure 24D:
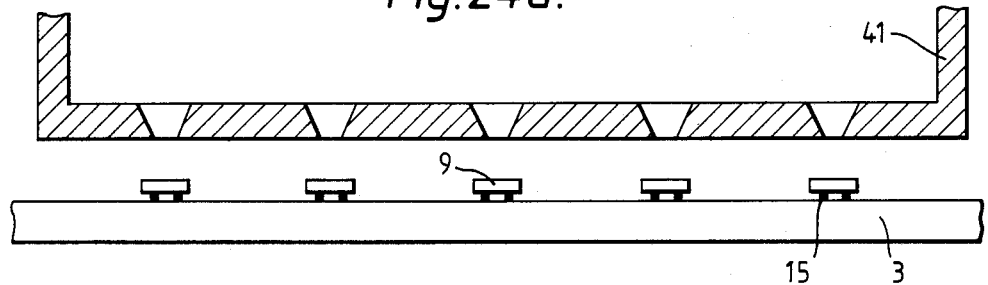
Figure 25:
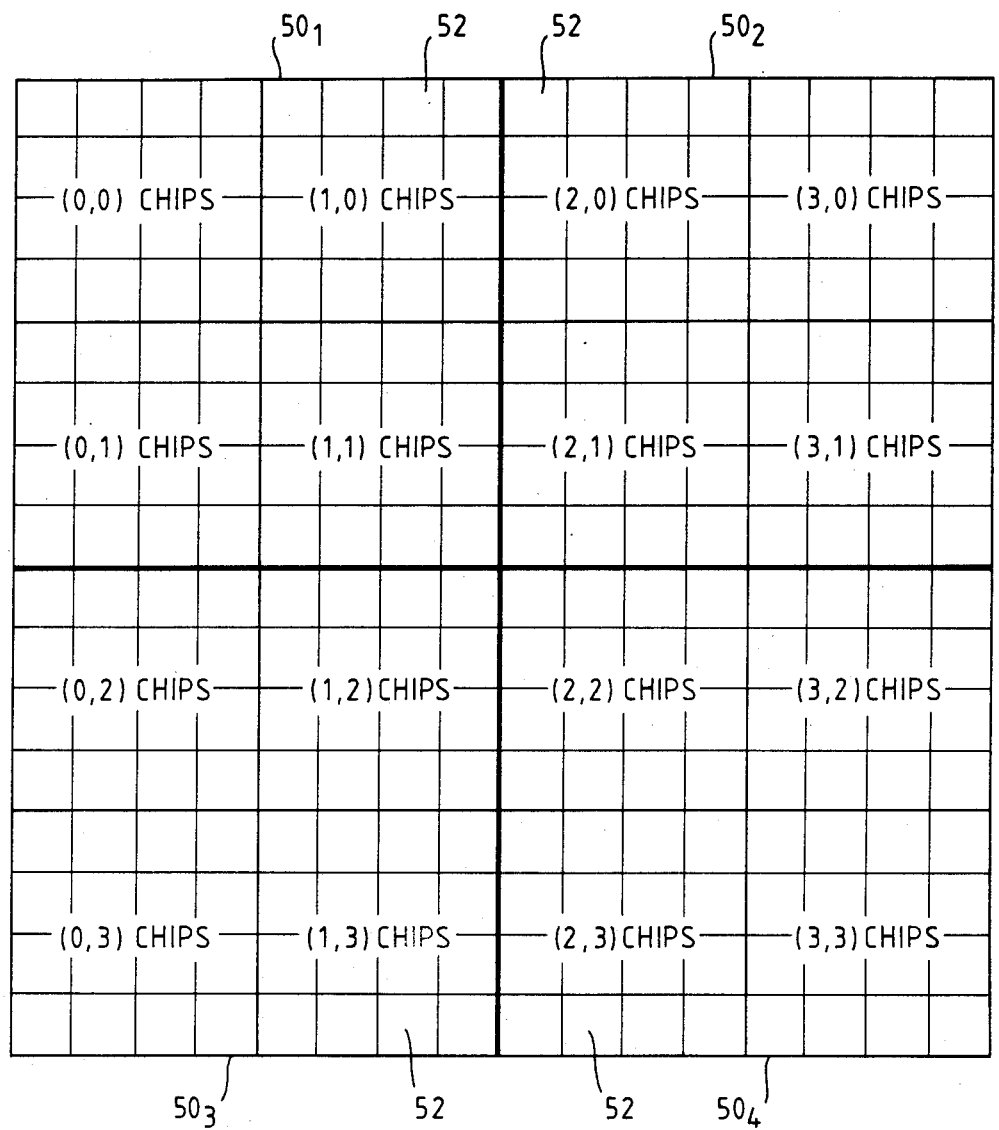
Figure 26A:
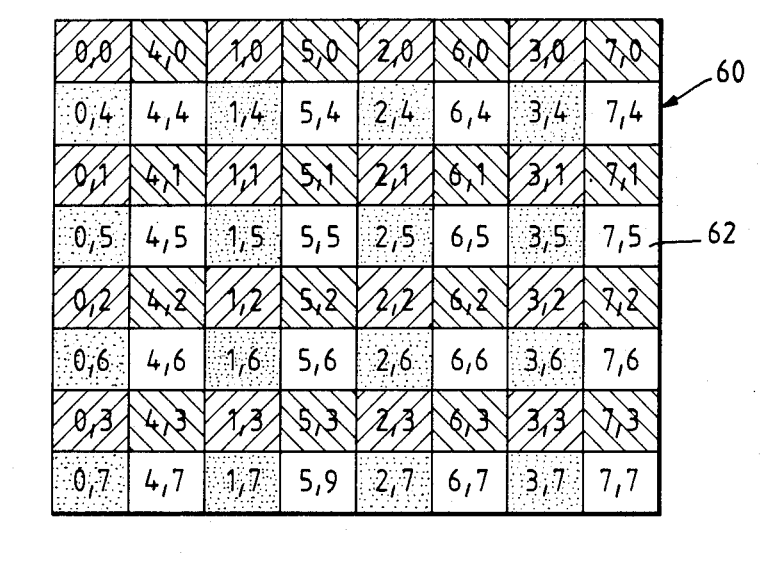
Figures 26B, 27:
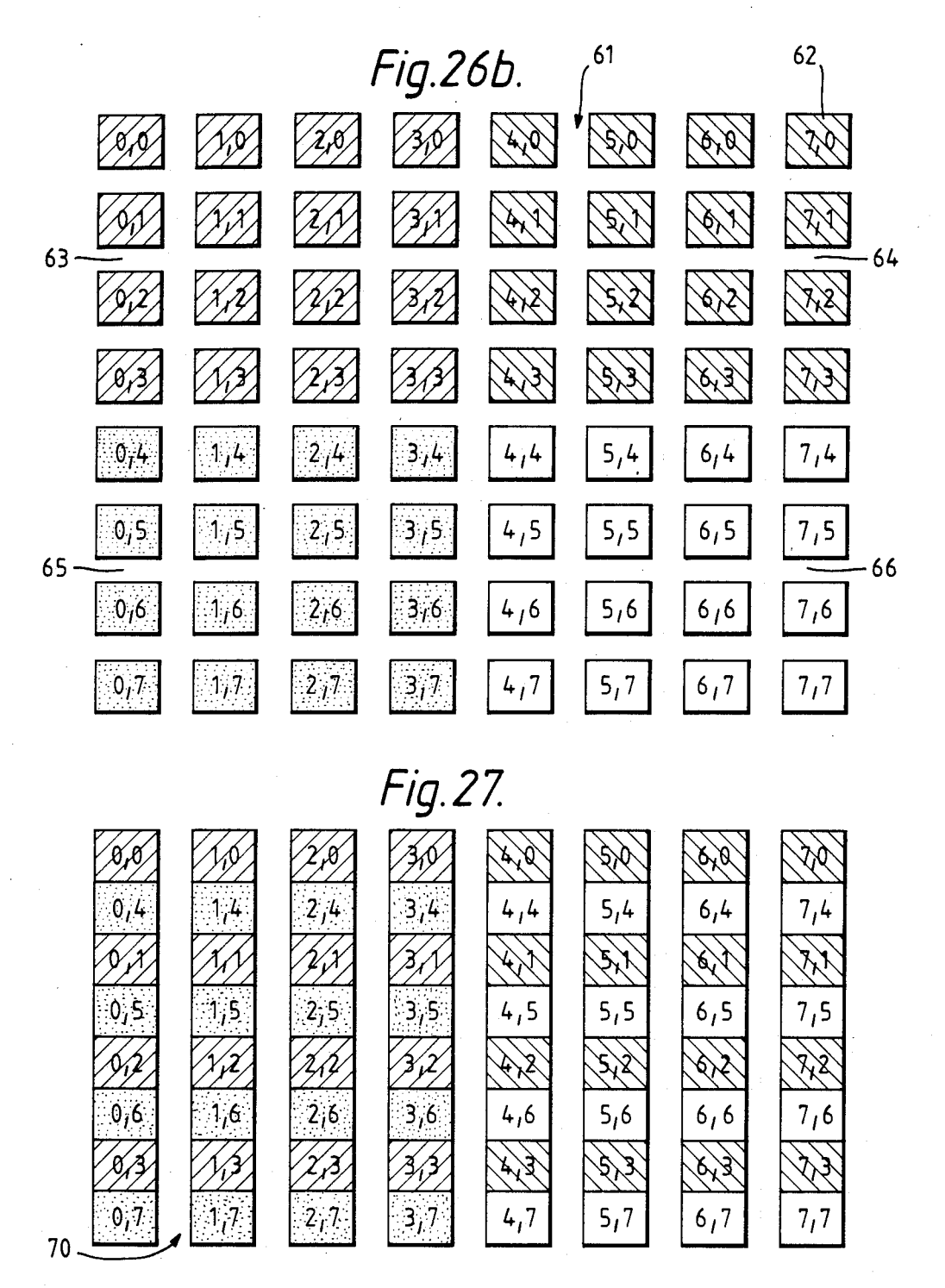

FIGS. 24a to 24d are sectional views of a vacuum chuck and chip array illustrating stages in a display manufacturing procedure, FIG. 25 schematically shows a plan view of four abutting chip wafers arranged for making displays with a vacuum chuck, FIGS. 26a and 26b are schematic plan views of chip arrays before and after positioning on a display, and FIG. 27 is a schematic plan view of a chip array after one step in a procedure for positioning chips from a wafer on a display.

DESCRIPTION OF PREFERRED CONSTRUCTIONS

By way of example, embodiments of this invention will be described.

EXAMPLE 1

An X-Y multiplexed bar-element flat-panel display 1 is shown in FIGS. 1 and 2. With reference to these figures and to FIG. 3, which shows a typical control circuit, this display 1 is seen to comprise electrode-bearing substrates 3, 5 spaced apart and arranged parallel to each other, each side of an encapsulated electrically-sensitvie fluid optical medium 7, in this example a medium of liquid crystal material. One of the electrode structures, structure 3E on substrate 3, is subdivided into a large number of discrete square pixel electrodes PL, PR. The other electrode structure, structure 5E on substrate 5, is continuous. A number of elongate strips 9, bars of single-crystal silicon semiconductor material, have been arranged over the surface of the pixel electrodes. These strips lie parallel to each other and are spaced at twice the pixel pitch apart. Each strip 9 extends in the Y-direction and overlaps a fraction of the area of each of the pixel electrodes PL,PR lying adjacent to its sides. Each strip 9 is located between the substrates 3 and 5, and serves as a spacer. The upper surface of each bar 9 bears a metal coating 11. Good effective electrical contact is provided between this coating 11 and the continuous electrode structure 5E. A glue containing conductive particles, or a soft metal solder, 13, e.g. indium, serves to provide this contact. This is intended to provide effective earthing for the semiconductor bar 9. The lower surface of each bar 9 incorporates contact pads:- pads PL', PR' —for contacting the pixel electrodes PL PR, and also pads XL', XR' for contacting X-address electrodes XL,XR defined in the lower electrode structure 3E. Contact between these pads PL',PR',XL' and XR' and the corresponding substrate electrodes PL, PR, XL and XR is made complete by soft metal solder, indium bumps 15. Each silicon bar 9 also incorporates a pair of drive lines D1, D2 together with a common Y-address line Y. Signals on the drive lines D1, D2 alternate each frame between positive and earth potential, and earth potential and negative, respectively. In the circuit shown in FIG. 3, the Y-line is connected to the gate of a first field-effect transistor T1. The source of this transistor T1 is connected to the X-address contact pad XR'. The drain of this transistor T1 is connected in parallel to the gates of two coupled transistors T2, T3 either complimentary p-channel/n-channel transistors or enhancement/depletion mode transistors operating in tandem. When a particular pixel is addressed, both the X-address and the Y-address go high once each frame. The drive signals alternate, and alternating potential is applied to the pixel electrode PR. It is arranged that the Y-address pulse ceases before the end of the X-address pulse so that charge is held on the gates of transistors T2 and T3. These transistors T2 and T3 are then held open for the duration of the frame, i.e., until the next reversal of drive potential on lines D1, D2.

TYPICAL DIMENSIONS

Silicon bars are 100 $\mu$m across with a 1 mm pitch. The liquid crystal layer thickness is 10 $\mu$m. This construction affords a factor of ten reduction in the amount of processed silicon needed compared with a monolithic display of like dimensions. The silicon bars 9 may be positioned mechanically—for example by the techniques used to transfer chips to the tape in tape bonding. (See 'The Status of Tape Automated Bonding', T G O'Neal, Semiconductor International, February 1981, p33–51, and 'Microelectronic Packaging', G Sideris, McGraw Hill, 1968, p249). This is practicable because a typical display need only contain a few hundred bars. Alternative chip transfer procedures are described hereinafter.

EXAMPLE 2

An X-Y multiplexed chip-element flat-panel display 1 is shown in FIGS. 4 and 5. In this display the semiconductor elements 9 are in the form of chips distributed in a two-dimensional array arrangement to match the pixel electrodes P. Each chip 9 is dedicated to the control of a corresponding one of the pixel electrodes P, part of which it overlaps. X- and Y- matrix address lines X,Y are incorporated in the surface of the lower electrode bearing substrate 3. Alternating-current signal drive lines D arc also provided on the substrate 3. These, as shown, are arranged parallel to the X-address lines X. Each chip 9 incorporates coupling pads X',Y', D' and P' to correspond to the address, drive and pixel electrodes X,Y,D and P. Accurate positioning of these pads X',Y',D', and P' relative to the underlying electrodes X,Y, D and P is a more difficult task than positioning in the previous example. For this reason, ac capacitative coupling rather than direct de contact is tolerated within the constraints of design. A self-alignment technique is adopted to ensure reasonable accuracy in positioning. Details of alternative techniques are discussed later in the specification—see below.

A problem of this configuration is that the X- and Y-address lines X,Y are orthogonal and must cross. This may be overcome by using multilevel metallisation. In preference to this, however, bridging links at each cross-over may be built into the design of each chip. In this latter case, at typical address rates—e.g. 50 kHz—considerable loss is introduced in the interrupted lines, largely due to parasitic capacitance. This is illustrated by the equivalent circuit shown in FIGS. 6A and B. Typical dimensions and impedance values are given below:

$R_t$: Resistance of each section of Y-address line, each 1 mm long, 10 μm wide and 1 μm thick, aluminum material: ~5Ω;

$R_l$: Resistance of bridging links, each 200 μm long, 2 μm wide and 1 μm thick: ~5Ω;

$C_p$: Pick-up capacitance, pad area 250 μm × 50 μm, dielectric spacing 0.1 μm, dielectric constant ε~3: $3.3_pF \equiv 1M\Omega @ 50$ kHz;

$C_e$: Capacitance of line on chip to earth (back electrode 5E): area 200 μm × 2 μm, 1 μm spacing, dielectric constant ε~3: $0.01_pF$;

$C_t$: Capacitance from track to top electrode: area 1 mm × 10 μm, 10 μm spacing, dielectric constant ε~20: $0.18_pF$.

The signal on the Y-line would decay by a factor $2C_t/C_p \simeq 11\%$ for each link. For this reason, boost amplification s provided by noninverting amplifier 15. As shown in FIG. 5, power for this amplification is derived by rectifying part of the ac drive signal—a rectifier 17 is connected between the drive pad D' and the earth electrode 5E. When both the X-address and Y-address are high the second transistor T2 conducts and connects the pixel electrode P' to the drive. Provided the Y-address pulse ceases before the end of the x-address pulse, the second transistor T2 will be held open for the remainder of the frame.

For a twisted nematic effect cell, a threshold voltage of about 2·volts is typical. For a dyed cholesteric-nematic phase change cell, a higher voltage of 10 volts is typical, for 10 μm layer thickness. In the design of the circuit, two conditions must be met. Firstly, the control transistor T2 (FIG. 5) must be able to turn the pixel on and off. It impedance must be small compared with the series impedance in the drive signal path, when it is conducting. Its impedance must be large when it is non-conducting. This condition s readily satisfied:

Transistor impedance: ON: ~KΩ; OFF: ~GΩ;
Pixel capacitance (1 mm square, 10 μm spacing, ε=20): 90MΩ@100 Hz;
Pick up and drive capacitance ($2 \times 10^{-8}$ m area, 0.1 μ spacing, ε@3): 30 MΩ each @ 100 Hz
Drive line resistance: ~few kΩ.

Secondly, the pixel drive voltage must be sufficient to cause the liquid crystal material to change state, regardless of processing variations across the area of the display. It is indeed helpful that the liquid crystal switching is relatively sharp and that the application of a larger signal than threshold has little appreciable effect other than increasing power dissipation. This allows considerable lattitude. A 5 V drive signal produces 5 V across the pixel if the pick-up impedances and drive capacitances are near zero—i.e. if the pads and electrodes are in good touching contact. On the other hand, a spacing of 0.1 μm leads to a voltage of 3 V across the pixel, which is still somewhat in excess of the 2 V minimum required to switch the pixel. This is well within the expected tolerance.

An alternative scheme for boosting signal routed through the chips is based on the circuit and layout of FIG. 7. This circuit relies on an additional line YY running parallel with each X-address line X. An extra coupling pad YY' is included in the chip 9. The line YY carries extra power for boosting the Y-address signal. Only on type of transistor is needed to implement this circuit.

In the foregoing circuits a number of faults can arise. The most serious are those that affect the tracks, since these can result in the loss of complete rows and/or columns of pixels. Such faults can arise as follows:

1. Open the short circuit in tracks: These can be avoided by testing the tracks before display assembly, followed by rejecting or repairing the electrode patterns as necessary. Parallel signal paths may be provided to reduce the incidence of catastrophic open circuit faults. This is especially important in the case of the bridged Y-address lines which are particularly vulnerable to this kind of fault. In the layout shown in FIG. 8, sections of the Y-address lines Y are extended in direction parallel to the X-address line X and Y-boost line YY so that they may be coupled to a pair if the chips 9. Connections within each chip 9 provide a continuous path, a bridging link, between broken parts of each Y-line Y. Provided that one or other of these links is made good, Y-signal will be propagated. The risk of interruption of the Y-lines is therefore reduced.

2. Pick-up electrodes on the chips may be badly aligned to the substrate and shorting the tracks: where the coupling is capacitive, as discussed above, this fault condition does not arise.

3. Faults on chip, short circuiting lines: This only arises in the case of do contact made between the chip pads and the lines. Protection may be afforded by including current limiting transistors in series with all transistor gates.

Faults, causing individual pixel failure, are also possible. These faults may be mitigated by circuit and layout duplication, or triplication. If capacitive coupling is adopted, parallel circuits, complete with coupling pads, can be embodied in each chip. Overall response thus will be an average. Circuit function can still result even in the event of one or some of these parallel circuits malfunctioning. The chips are all of the same design, so it is relatively easy to replace any chips that malfunction.

EXAMPLE 3

A data-addressed chip-element flat-panel display 1 is shown in figures 9 and 10. Each chip 9 is arranged in a position where it overlaps four pixel electrodes P simultaneously. Each chip 9 incorporates four coupling pads P' which are arranged to couple capacitatively with the adjacent pixel electrodes P. The substrate electrode structure 3E also includes electrode tracks D, E and F running parallel in one direction between alternately adjacent pairs of the pixel electrodes, to carry drive signal, signal data including address information, and chip-to-chip data, respectively. Corresponding coupling pads D', E' and F' are incorporated in each chip 9. Coupling between pads D', E' and F' and the corresponding lines D, E, and F is capacitive.

The functions of circuits on the chips 9 can be broken down into four basic roles. Firstly, ac power from the coupling pads D' has to be rectified, smoothed and stablised so that it can be used to power the rest of the circuits. Secondly, ac data input signals, such as the frequency modulated signals shown in FIG. 12, requires conversion to binary logic DC voltage levels to which subsequent circuit logic can respond. As shown in FIG. 11 this part of the operation is performed using a pair of RC filters F1,F2 and a comparator CC. Each filter F1, F2 is designed with a different cut-off so the parallel pair can distinguish between frequency modulated pulses such as those shown in FIG. 12. When a pulse of the lower modulation frequency is applied to the pair of filters F1, F2, a logic O signal is produced at the comparator output. When a pulse of the higher modulation frequency is applied, a logic 1 signal results. Thirdly, the train of pulses has to be decoded. The train of binary digits thus produced are fed into a shift register S/R. Register transfer is controlled by a rectifier R, a smoothing filter F3 and a monostable M. The monstable M delays the register clock signal long enough to allow time for the binary signal to emerge from the comparator output, following the incidence of each modulated pulse. The register contents are relayed to the gates of a series of n-channel and p-channel field effect transistors which together provide a correlation filter. Coincidence is recognised when the logic 0,1 sequence is matched to the n and p channel sequence of the correlation filter. Once the chip recognises that it is being addressed, it feeds the succeeding bits of data into a memory. Each chip may incorporate logic circuitry responsive to a number of different address codes. One code then may be used to address each chip individually. Other codes then may be used to address several chips simultaneously. Thus lines of pixels, or blocks or other patterns can be generated in response to a single code, making such pattern generation altogether faster. Chips may include several address recognition circuits in parallel for this purpose. Finally, this memory has to store data to indicate the state of the pixels controlled by the chip, and these pixels have to be driven at the correct frequency. An oscillator is required to drive the pixels and this may be provided by an astable, or by dividing down the timing signal frequency.

The frequency of the information and the power carrying signals is restricted by the RC time constants of the electrode tracks. It is difficult to reduce the track resistance below about $5k\Omega/m$ or the capacitance below $200pF/m$. The maximum frequency which can be employed on a section of track of length L (in metres) is therefore under $8\times10^4/L^2 Hz$. The loading on the tracks from the circuits reduces this by a further factor of about 2. The data rate must be an order of magnitude less than this. Thus if $L \approx 0.3$ m, the maximum data rate is $4.0\times10^4$ bits/sec. Up to eight bits may be needed to announce the start of a packet of information, twenty to indicate which of $10^6$ or so chips are being addressed and twelve to tell the chip what to do to update the four or so pixels under its control—forty bits in total. Thus a total of $10^3$ chips ($4\times10^3$ pixels) can be updated each second. This is adequate for a graphics VDU, but hardly suitable for TV application. However, there is no need to have just one encoder for the whole display; instead a number of encoders EE may be used in parallel, for example one to each line. Using lines 15 cm long and 150 chips per line (controlling 600 pixels), the pixels can be updated 25 times per second, clearly adequate for TV. The updating rate decreases rapidly as the screen size is made larger. For this reason it is desirable to drive the display from both sides, as is shown in FIG. 13, but even so it is likely to prove difficult to design TV screens more than 30 cm (12") across.

PROCESSING

Processing techniques for making displays of the invention will now be described with reference to FIGS. 14 to 27. Chip circuits 21 may be made using a CMOS process on a silicon wafer 23 which has an etch stop layer 25 buried beneath its surface. Grooves are etched down to the etch stop 25 and the wafer 23 stuck face down onto the surface of an elastomeric sheet 27. Each chip 9 is fastened at one point 29 (FIG. 14). The wafer is then etched from the back to remove the bulk silicon and the etch stop layer 25. The chips 9 are then spread into an array by stretching the elastomer 27 (figures 15 to 18). The chips are then stuck down onto an electrode bearing substrate 5 and the elastomer sheet 27 removed. A second electrode bearing substrate 3 acts as the lower substrate of the panel 1. A metallisation pattern is made on this substrate to provide pixel electrodes, power lines, etc. Since there may be slight nonuniformities in the stretching of the elastomer 27, it is necessary to ensure that this pattern is aligned with the chips 9 at all points. This can be achieved by placing a mask pattern 31 on the elastomeric substrate which would be stretched together with the chips 9. A photolithographci process is then used with the mask pattern defining the electrode pattern on the lower face of the display panel. Alternatively, the array of chips 9 on the upper substrate 5 can be illuminated at a shallow angle and the shadows cast can be used to photolithographically produce a matching electrode pattern (FIGS. 10 to 23). The substrates 3 and 5 are then placed together, the panel filled with liquid crystal material 7 and sealed.

The process may be carried out by steps (1) to (15) set out below:

1. Grow 10 μm of epitaxial silicon on top of a p++ or buried oxide layer 25. This buried layer will later act as an etch stop. A buried oxide layer may be produced under silicon by ion implantation, silicon anodisation or by recrystallisation of polysilicon deposited on oxide. Silicon may be anodised in hydrofluoric acids. If appropriately doped silicon is used, silicon structures separated from the bulk by a porous film can be produced. In all cases the silicon layer may be thickened by further epitaxial deposition.

2. Make integrated circuits 21 using e.g. a standard CMOS process.

3. Cover the circuits 21 with a passivation layer 33 such as a layer of nitride. (this may be produced by sputtering, plasma assisted chemical vapour deposition or, if metallisation on the chips is polysilicon or silicide, by chemical vapour deposition).

4. Pattern the passivation layer 33 and etch down to the etch stop 25 using plasma or an anisotropic etchant, e.g. ethylene diamine pyrocatechol or aqueous potassium hydroxide, using the patterned passivation layer 33 as a mask.

5. Put globules of material 29, e.g., photoresist, 1 $\mu$m high and 3 $\mu$m in diameter, at a given point on each chip 9. Preferably this is close to one corner of the chip.

6. Place the structure face down onto the surface of a glue-coated planar elastomeric sheet 27. The globules 29 serve to ensure single point contact between each chip 9 and the sheet 27. The configuration is shown in FIG. 14. The best elastomer thus far identified is amorphous polyethylene terapthalate (PET), a material manufactured by ICI Plastics Division, England. This material stretches uniformly on both a microscopic and macroscopic scale at 80 C. and yet is rigid at room temperature. It is also inexpensive, non-contaminating (it contains only carbon, hydrogen and oxygen) and is resistant to chemical attack.

7. Mount the elastomer sheet 27 in a holder and etch the silicon array from the back of the wafer 23, until the etch stop 25 is reached.

8. Remove the etch stop layer 25 to separate the individual silicon chips 9. In the case of oxide as etch stop layer 25, this may be performed using buffered hydrofluoric acids. Alternatively the etch stop layer 25 may be removed by plasma etching or by ion beam milling.

9. In necessary, wash carefully and dry.

10. Apply a metal coating to the back surface of the chips 9 by evaporation at a shallow angle to avoid filling grooves or coating the elastomer (see FIGS. 15 and 16).

11. Stretch the elastomeric sheet 27 slowly by a factor 4 in each direction. This may be performed using a large number of clamps about the periphery of the sheet 27. (See FIGS. 17 and 18). Alternatively the sheet can be clamped and expanded by hydrostatic pressure. The shape of the expanded elastomer can be determined by means of a mould.

12. Lower onto the electrode bearing substrate 5 and affix. The continuous electrode structure 5E on this substrate 5 serves on each electrode for the panel. A conductive adhesive agent is used. Since in general conductive glues and solders are opaque, surplus material is removed. This may be achieved by coating the substrate 5 with a suitable agent, eg indium metal, covering with photoresist, using the chips as a contact mask, illuminating, developing the photoresist, dissolving away the exposed agent and removing the remaining photoresist, leaving pads of glue or solder corresponding in size and position to the chips 9. Alternatively, the chips can be located on the adhesive agent and used as masks to protect this agent during removal of surplus material so that adhesive agent remains only beneath the chips.

13. Remove the resist globules 29. This may be done using acetone as solvent. The elastomeric sheet 27 is then removed.

14. The substate 3 which is to be used to form the other face of the display panel 1 must be patterned so as to produce power and data lines and the pixel control electrodes P of the display. The power and data lines must be of low resistivity, and must be of a good metallic conductor such as aluminium. The liquid crystal pixel control electrodes can be of either metal or a transparent conductor, eg, cadmium stannate or indium tin oxide. In either case the pattern must be aligned to the actual distribution of the chips 9, since it is unlikely that the stretching will be accurate enough to allow use of non self-aligned technique. The may be achieved in two ways:

(i) The first is to lay down a pattern on the elastomeric sheet before it is stuck to the wafer in step (6). This pattern would be made of a material which would stretch with the elastomer, eg resist or rubber. It would correspond to the pattern of electrodes which is eventually required and would be aligned with the wafer. After the elastomer has been stretched and the chips removed, the pattern can be used to produce a photomask to pattern the lower electrode 3E of the display.

The material of which the pattern is made is not usually very opaque, so it will not furnish a mask directly. One way of getting round this is to deposit a thin layer of metal on the pattern after the elastomer has been stretched. The metal can then be patterned by liftoff. The resulting metal pattern can then be used to make a mask which in turn can be used to photolithographically define the electrode pattern 3E on the lower substrate 3. This two step process is needed because each step produces inversion of the image. By going through two steps the original pattern is regained so that the pattern on the lower substrate 3 is a faithful copy of that on the elastomeric sheet. By choosing the photographic process, and the process used for producing the electrode pattern on the lower substrate 3 to be direct or reversal processes, the pattern produced on the lower substrate 3 can be made either the same as or the reverse of that on the elastomeric sheet 27. For example, if the elastomeric sheet 27 has a resist pattern 31 on it which is the same as that illustrated in FIG. 15 (before stretching) or FIG. 17 (after stretching), and liftoff is used, then the metal pattern on the elastomer becomes similar to that desired for the electrode pattern on the lower substrate 3, as shown in FIG. 9. If a reversal process is used both to make the mask and to transfer the mask pattern to form the electrode pattern on the lower substrate, the electrode pattern of FIG. 9 is produced on the lower substrate. Messy lift off may be avoided if the pattern is made either using a dye (eg procinyl red G) on the elastomer, or using a dye-containing material. An opaque pattern could then be made directly. If the dye pattern consisted of two layers containing dyes which absorb at different wavelengths, then it could effectively contain two different patterns, both aligned with the chips. The result which is produced when the elastomer is used as a lithography mask would depend on the wavelength of the light used. This would make it possible to produce metallisation patterns of two different materials eg aluminium for power lines and indium tin oxide for the pixel control elements, both aligned to the chip pattern. If a dye were in the resist, the resist would have to be patterned at a wavelength at which the dye did not absorb.

(ii) The second method is to use the substrate 5 with the chips 9 on as a shadow mask which can be used to define a matching electrode pattern 35 on the lower substrate 3. The process is illustrated in FIG. 19. In order to avoid diffraction problems it is best if the chips are actually resting on resist 35. Shadows 37 produced are clearly much too large to form useful features, but provided the mounted chips are displaced sideways and another exposure is performed, much thinner features 39 can be produced (FIG. 20). After each photolith step the patterned metallisation 3E is passivated before the next step, eg by anodisation or by deposition of a dielectric such as silicon dioxide.

It is straightforward to build up the regular pattern in the display itself, but one problem is to make correct connections to the ends of the power and address lines. This can be achieved by a combination of two techniques. Firstly, chips 9 at the ends of rows are chosen to be wider than those elsewhere and the chips 9,9' raised above the lower substrate 3, e.g., by the insertion of a glass plate between the chips 9 and the lower substrate 3. More than one light source is used. Full shadow is produced only by the larger chips 9' (FIG. 21). Secondly, it is possible to make one set of address lines with shadows going one way and ones set with the shadows going in the opposite direction so the contacts to the two sets of lines extend out of the array in different directions (FIG. 22). Using these two techniques it is quite possible to make a structure of the type illustrated in figure 23. Electrodes D are produced by the technique of FIG. 19. Electrodes Dd are produced by shifting the chips 9 sideways making one exposure, using the technique of FIG. 21, then shifting the chips sideways in the opposite direction and making another exposure.

The latter technique (ii) has the advantage that some features can be made using one type of metallisation and others using a different type, but the former technique (i) is simpler and less expensive and is therefore to be preferred.

15. Stick down the chips 9 and top substrate 5 to the bottom substrate 3 and fill with liquid crystal material 7.

Referring now to FIGS. 24a to 24d, there is illustrated in section apparatus for a further process for mounting integrated circuit chips in a flat-panel display. A wafer (not shown) is attached releasably to a surface 40 and divided to form a two-dimensional array of chips such as 9 with solder bumps 15 as previously described, one row of the array of chips being shown. As shown in FIG. 24a, a vacuum chuck 41 is positioned over the chips 9. The chuck 41 has holes such as 43 spaced appropriately for location adjacent every third chip 9. As shown in FIG. 24b, an inner region 45 of the chuck 41 is evacuated; every third chip 9 is lifted by the chuck 41 and thereby released from the surface 40. The released chips 9 are transferred to an electrode-bearing display substrate 3. A heater 47 is employed to melt the solder bumps 15 attaching the chips 9 to the substrate 3. Finally, as shown in FIG. 24d, the chuck vacuum is released and the chuck 41 removed. These operations may be repeated as required to deposit a larger umber of chips. FIGS. 24a to 24d show every third chip 9 being positioned. By repositioning the chuck between each cycle of operations and carrying out three cycles, all chips may be transferred to the display.

The vacuum chuck may be made by engineering techniques. Because chips are a few hundred microns across, machining holes of the appropriate size and spacing is not straightforward. It is preferred to employ a chuck with a silicon surface perforated by anisotropic etching. A 100 orientation silicon wafer is polished on both faces and a 1 μm oxide layer is grown thereon. Holes are etched in one oxide layer face by conventional photolithographic masking techniques. The wafer is then etched anisotropically with an etchant which attacks 111 planes far more slowly than other planes, eg EDA, solutions of potassium hydroxide in water or water-alcohol mixtures. These procedures are described in Proc IEEE 70 (5) pp 420–457, May 1982, K E Peterson. The silicon wafer is etched back until 111 planes are reached, and etching virtually ceases. This produces holes through the silicon defined by 111 crystal planes. The residual oxide layer is removed with 5:1 ammonium fluoride: hydrofluoric acid to produce a perforated silicon plate.

The perforated silicon plate may be provided with a backing support, such as a metal element with drill holes providing vacuum communication to the perforations. Either the silicon plate or the backing support is grooved so that vacuum communication is arranged via the holes in the support, the grooves and finally the silicon plate perforations. This reduces the precision necessary in drilling holes in the support.

Referring now to FIG. 25, there is shown a square array of four abutting wafers $50_1$ to $50_4$ arranged for application of chips to a display larger in extent than one wafer. Each wafer 50 is a square array of sixty-four chips of four different respective kinds. Each chip is indicated by a square such as 52. The wafers $50_1$ to $50_4$ provide a total of sixteen kinds of chips. Each chip kind is located in a respective quarter section of a respective wafer. For example, the sixteen chips adjacent the reference (0,0) in FIG. 25 form the upper left quarter of wafer $50_1$. References (m.n) (m,n =0,1,2 or 3) in the figure both identify the sixteen different kinds of chip 52 and indicate the chip position on a display substrate. First reference m indicates the mth display column and second reference n the mth display column.

The chips are separated from one another in the wafers 50 as previously described. A vacuum chuck large enough to cover all four wafers is employed to transfer one chip of each kind to a display.

The chuck has a hole spacing equal to the distance between centres of four collinear chips. The holes form a two-dimensional array, and the chuck transfers one chip from each wafer quarter section to produce one display substrate. The chuck is then repositioned to transfer successive sets of different chips to successive substrates. This procedure is useful inter alia in forming a display incorporating chips which have different pre-arranged address codes.

Referring now to FIGS. 26a and 26b, there are shown chip layouts 60 and 61 respectively before and after positioning on a display substrate (not shown) in a four stage transfer procedure. Chip layout 60 corresponds to a wafer divided into individual chips as previously described. Each chip such as 62 is labelled with column and row indices (m,n), where m,n =0 to 7, these indicating positions on the display substrate.

Chips 62 in layout 60 have one of four forms of shading, rightward oblique, leftward oblique, dotted or clear. The arrangement is such that any four adjacent chips all differ in shading. Moreover, chips of like shading are spaced appropriately for location in a respective quarter section of layout 61 in which chip shading corresponds. A vacuum chuck is employed having a 4×4 square array of suction holes with a centre spacing equal to that between alternate chip centres. This enables the chuck to raise all chips of one respective shading in one transfer step. Initially, the chuck is employed to raise all chips with rightward oblique shading. These are then transferred to the upper left quarter 63 of display layout 61. On three subsequent transfer stages, the chips with leftward oblique shading, dots and no shading are transferred respectively to the upper right, lower left and lower right quarters 64, 65 and 66 of display layout 61.

When a large number of transfer operations is required in operations using the immediately foregoing procedure, an alternative approach may be adopted. Referring now also to FIG. 27, the chip layout 60 of FIG. 26a could be repositioned into the spaced column array 70 in a first step. This would require a first vacuum chuck arranged to raise alternate columns of chips. A second chuck would then be employed to reposition alternate chips in each column, recreating the FIG. 26b display layout 61. The advantages of this become apparent if the spacing of the chips on the display substrate is to be four times the chip dimensions in both X and Y directions. The FIG. 26 approach requires sixteen transfer steps with one chuck, but that of FIG. 27 eight steps with two chucks.

Chip or bar positioning on a display substrate may also be carried out by the use of a "pick and place" machine. This may be appropriate for positioning comparatively few elements, eg an array of silicon bar elements.

We claim:

1. A display comprising:
    (a) a first substrate bearing an electrode pattern comprising pixel activation electrodes and pixel address electrodes arranged to define a two-dimensional pixel array,
    (b) a plurality of discrete single-crystal integrated circuits which are (i) formed independently of display construction, (ii) arranged on said first substrate with nearest neighbor separation greater than linear dimensions of said integrated circuits, (iii) electrically connected between the pixel activation electrodes and pixel address electrodes and disposed such that the pixel activation electrodes are at least partly unobscured by said integrated circuits, and (iv) arranged to activate at least one of said pixel activation electrodes in response to corresponding pixel address signals,
    (c) a second substrate bearing a pixel activation electrode layer arranged facing said electrode pattern of said first substrate, said second substrate being supported on said plurality of integrated circuits to define an interelectrode spacing between said first substrate and said second substrate, and
    (d) a liquid crystal material (i) filling said interelectrode spacing other than where said plurality of integrated circuits are located and (ii) arranged to be optically responsive to signals form the integrated circuits appearing across the pixel activation electrodes of the first and second substrates respectively.

2. A display according to claim 1, wherein said plurality of integrated circuits are in the form of chips arranged as islands in an otherwise continuous layer of said liquid crystal material between said first substrate and said second substrate.

3. A display as claimed in claim 2, wherein each ship overlaps and is connected to a plurality of said pixel activation electrodes as appropriate to control drive signal application to a respective one pixel associated with said pixel activation electrodes.

4. A display as claimed in claim 2, wherein each of said chips includes a bridging link connecting adjacent sections of one of said pixel address electrodes.

5. A display as claimed in claim 4 wherein the bridging link includes a boost amplifier arranged to amplify address signals.

6. A display as claimed in claim 1, wherein each of said integrated circuits includes circuitry for data address recognition.

7. A display as claimed in claim 6, wherein said integrated circuits are coupled together as appropriate for data transfer therebetween.

8. A display as claimed in claim 6, wherein said integrated circuits are in the form of chips are arranged in rows with at least one respective chip address encoder per row.

9. A display as claimed in claim 8, wherein each row has two respective chip address encoders each at a respective row end.

10. A display according to claim 1, wherein said plurality of integrated circuits are in the form of bars arranged alternately with said liquid crystal material between said first substrate and said second substrate.

11. A display according to claim 1, wherein each of said integrated circuits includes circuitry for extracting power form signals applied to said electrode pattern.

* * * * *